Oct. 13, 1959      E. S. MARVIN ET AL      2,908,209
LENS FOCUSING MECHANISM FOR CAMERAS
Filed Sept. 23, 1957      2 Sheets-Sheet 1
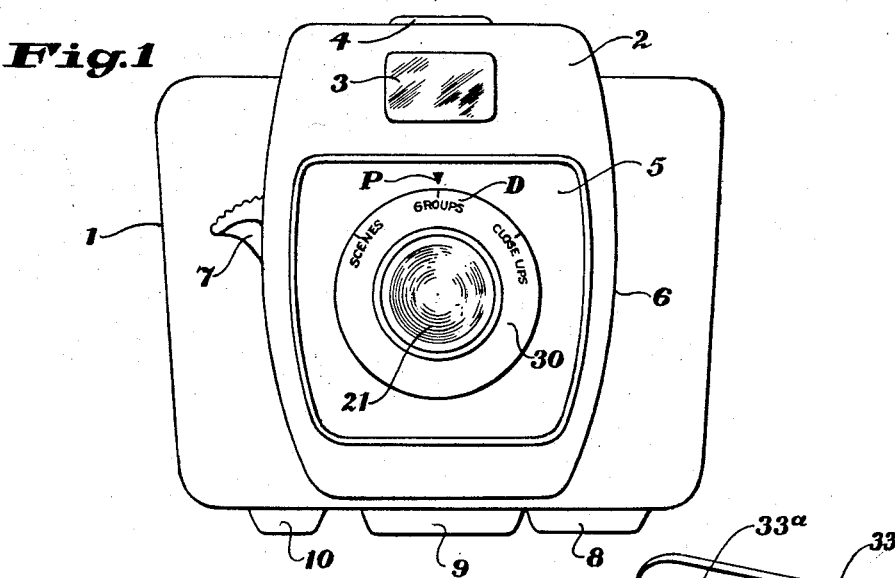
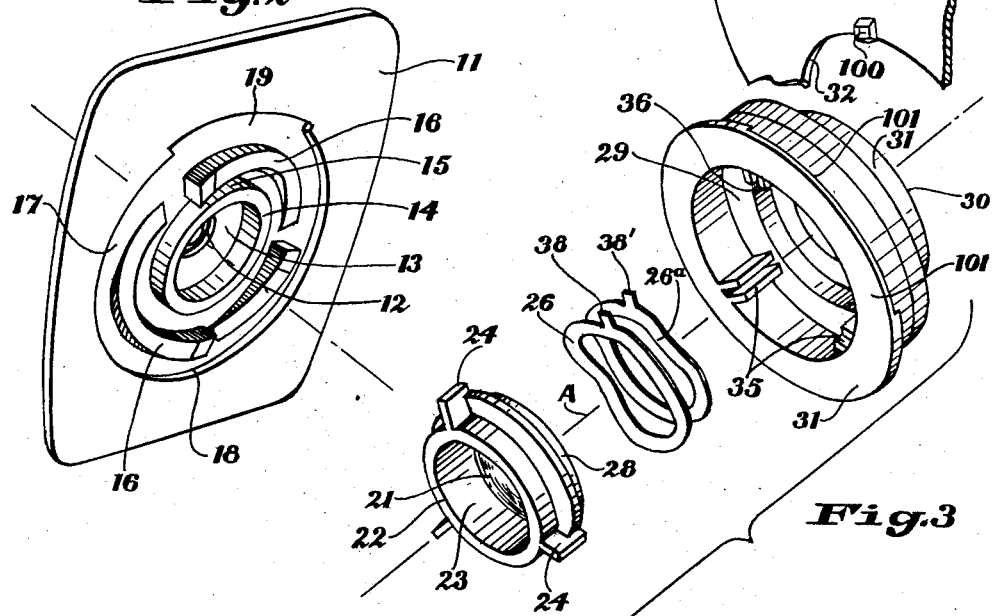
Edgar S. Marvin
Robert F. O'Brien
INVENTORS
BY
ATTORNEYS

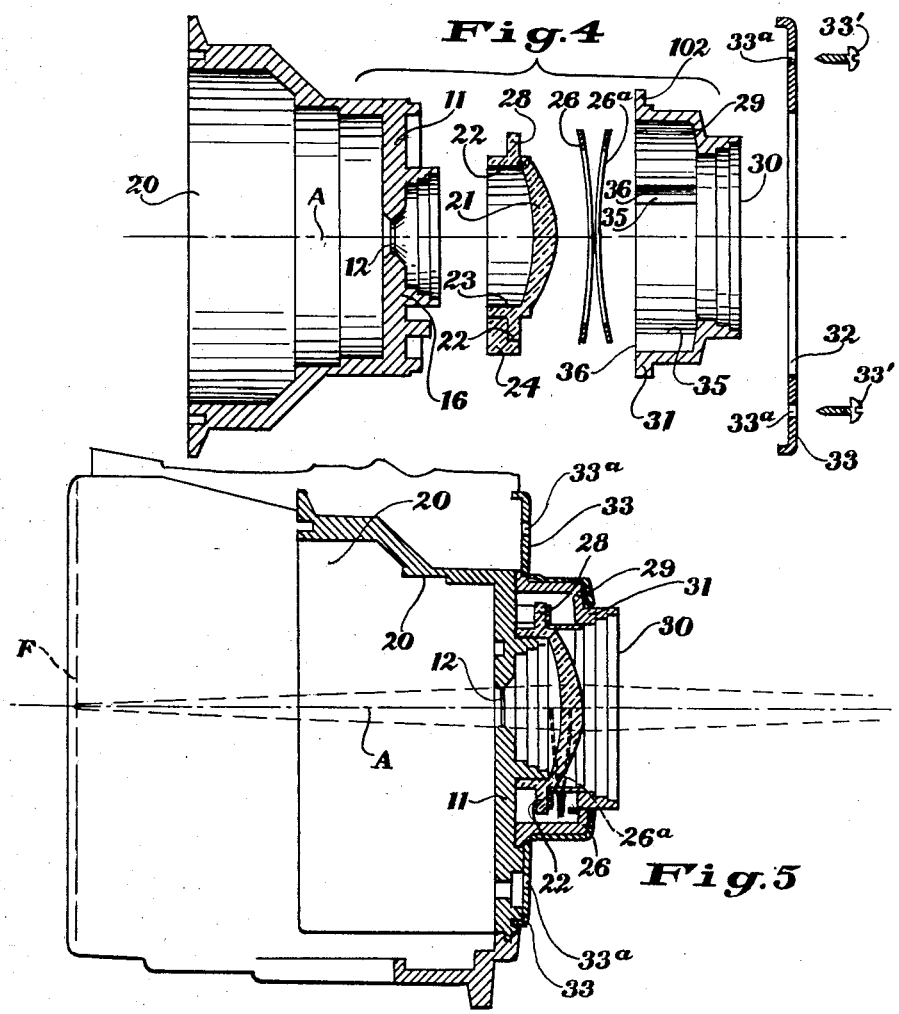

United States Patent Office 2,908,209
Patented Oct. 13, 1959

2,908,209

LENS FOCUSING MECHANISM FOR CAMERAS

Edgar S. Marvin and Robert F. O'Brien, Rochester, N.Y., assignors to Eastman Kodak Company, Rochester, N.Y., a corporation of New Jersey Application September 23, 1957, Serial No. 685,590

2 Claims. (Cl. 95—45)

This invention relates to photography and more particularly to lens focusing mechanisms for photographic apparatus such as cameras, projectors or the like.

One of the relatively expensive parts of photographic equipment is the focusing mechanism by which a lens or an objective is mounted for movement to and from a focal plane of the apparatus. In order to obtain best results during such focusing movement, the objective must be held very accurately on an axis exactly at right angles to the focal plane. Even slight deviations from this axis destroys or at least reduces some of the corrections in the optical system and thus deteriorates any image formed at or projected from a plane, generally known as the film plane. Even moving the objective axially sometimes tends to tilt the objective angularly with respect to the axis. With known constructions quite a number of relatively expensive and accurately formed parts are generally required for a satisfactory focusing mechanism even if the remainder of the apparatus—the camera or the projector box—is relatively inexpensive.

One of the objects of our invention is to materially reduce the cost of such focusing mechanisms. Another object is to improve the quality and accuracy of movement of the movable parts of a focusing mechanism. Another object is to reduce the assembly costs of a focusing mechanism. Still another object is to provide a mechanism of a minimum number of simple parts which may be assembled without any hand work on the parts. Another object is to eliminate the necessity of setting the objective to various focal distances to obtain an initial or factory setup so that the objective will be in focus at various focal distances. Still another object is to eliminate the necessity of adjusting focusing scale members to different positions for different cameras or projectors in order to obtain the necessary focusing range. A still further object of our invention is to provide a simple type of focusing mechanism of essentially three parts and of a design which can be readily formed by molding the parts. Other objects will be disclosed in the following specification, the novel features being particularly pointed out in the claims at the end thereof.

In the drawings:

Fig. 1 is a front plan view of a typical photographic apparatus, here shown as a camera, equipped with a focusing mechanism constructed in accordance with and embodying a preferred form of our invention;

Fig. 2 is a rear perspective view of a front plate which is incorporated in the camera shown in Fig. 1 and which forms one part of a focusing mechanism;

Fig. 3 is an exploded view showing the several parts used in the focusing mechanism for the apparatus of Fig. 1. This exploded view is shown with the parts in perspective;

Fig. 4 is an exploded view of a slightly different embodiment of our invention with the parts shown in cross-section;

Fig. 5 is a view partly in elevation and partly in section showing an assembled focusing mechanism; and Fig. 6 is a different embodiment of a lens unit for our invention, this view showing a cross-sectional view of the modified embodiment.

Our invention is directed to a focusing mechanism for cameras, projectors and other photographic apparatus in which the parts for mounting and focusing an objective are so made that by a simple assembling operation the parts may be brought together without fitting and without the necessity for relatively skilled workmen to form an accurate and inexpensive focusing device.

More specifically, a preferred form of our invention as shown in the drawings may be built into an inexpensive box-type camera or any other camera or projector which requires movement of an objective relative to a focal plane for forming an image.

As shown in Fig. 1, a camera body 1 may be provided with a front extension 2 in which there may be the usual finder lenses 3 and 4. This embodiment includes a preferably decorative front plate 5 carried by a portion 6 of the forwardly projecting extension 2 on the front of the camera and a trigger 7 for operating a shutter which may be of a known type. There may be a winding key 8 on the bottom for moving the film, a rest pad 9 and an extension 10 on the camera bottom so that when the camera is set on a flat surface, it will be firmly supported by these three members.

As indicated in Fig. 2, the camera may be provided with a front plate 11, the innermost side of which is shown in this view. It will be noted that this front plate 11 forms a support for a part of the focusing device which includes a central exposure aperture 12, a shoulder 13, an inwardly extending flange 14 having a curved guiding surface 15. This is preferably cylindrical. A series of wedges 16 which form inclined and preferably arcuately shaped ramps lie in a position generally concentric with the tubular extension 14, and on a plane surface 17 which may be recessed into the front of the camera.

It is usually desirable to utilize the exposure aperture 12 as a diaphragm by placing it the proper distance from an objective 21. The diameter of the opening is selected to give the desired ratio of aperture for the focal length of the objective selected. The edge 18 of the recess 17 is here shown as generally circular with an offset portion at 19, the purpose of which will be hereinafter described. This front plate or support 11 may, if desired, form a part of the inside 20 of a camera body, as shown in Fig. 5. It will be noticed that the aperture 12 through which the light rays may pass may permit the light rays to be brought to a focus at the focal plane, here shown in dotted lines at F.

It is to be understood that for the more highly corrected objectives the focal plane F usually lies in a plane whereas for the simpler type of lenses, instead of an actual plane the image may be focused on a cylindrical or curved surface which helps correct for the curved field of the lens, but in each case when the term "focal plane" is used in this application, it is intended to cover a focal plane which is either curved or which accurately lies in a plane.

Whether or not the support 11 forms a portion of the camera body, as indicated in Figs. 4 and 5, it forms the main support for, and a part of, the focusing mechanism. It will be noted from Figs. 3 and 4 that the objective 21 is preferably made in one piece with a cylindrical portion 22 having an inner surface 23 which may slide on the cylindrical surface 15 of the support so as to be accurately guided thereon. Close fits can readily be obtained by molding the parts. It will also be noted, Fig. 3, that the tubular member 22 carries a series of radially extending arms 24, here shown as being three in number. One of each of these arms is adapted to engage one of each of the inclined surfaces or ramps 16 of the support 11. Thus the objective unit includes a second element of the focusing device.

Next to the objective I prefer to place two spring washers 26 and 26ª which are bent or corrugated so that they will press against the smooth flange 28 of the objective member and thereby press the radially extending arms 24 against the corresponding ramps 16 when these washers are pressed inwardly or compressed by a surface 29 on the focusing member 30. This focusing member 30 constitutes a third element of the focusing device and is provided with an outwardly extending flange 31 which may rest against the edges of an aperture 32 in the front plate 33. This front plate may be attached to the camera body 1 by means of screws 33' passing through apertures 33ª.

On the inside of the adjusting member or cap 30 there are three sets of parallel arms 35, the space between these arms 36, as best shown in Fig. 3, constituting guideways parallel to the lens axis A and in which the three outwardly extending lugs 24 on the lens unit may engage. Thus, as the objective is guided for movement back and forth, it may also be turned by the adjusting member 30, thereby causing the radially extending lugs 24 to ride over their corresponding ramps 16 as this turning movement occurs so that the objective may move along the axis as the spring washers 26 and 26' are more or less compressed during this movement.

Each spring washer may include a guiding lug 38 and 38' which may also be engaged in one of the guideways 36 between the parallel rails. As indicated in Fig. 1, the adjusting member 30 may move to bring any one of the designations D opposite a pointer P to indicate the focus which may in inexpensive cameras be indicated as close-ups, groups and scenes, as shown on the drawing, or which may be graduated into ordinary units of focal distance, as is common in camera construction. Rotation of the adjusting member 30 may be limited by a lug 100 swinging in the reduced area or cutout 101 of flange 31. In lieu of this, there may be a stop 102 in the form of a lug shown in Fig. 4, this lug being movable only in the cutout area 19 shown in Fig. 2. Either motion limiting means is preferably arranged to the focusing range from a nearby object, such as from 3 to 5 feet, for instance, to infinity.

Fig. 6 shows a somewhat more complicated objective and is a different embodiment of the lens unit. The lens may be of the "Cook" type: three elements, lenses 50, 51 and 52, are axially aligned in a barrel portion 53 preferably integral with lens 50. This barrel has a surface 54 to slide on the cylindrical guideway 15. Lens 51 has an integral sleeve 55, and lens 52 a similar sleeve 56. These can be inexpensively assembled with a press fit and, if desirable, a little adhesive. A separate diaphragm plate 57 may be used if desired. The tubular barrel 53 has three radially extending arms 58 which may coact with the inclined surfaces or ramps 16 as in the case of the first described lens embodiment of our invention, and they may be guided in the slots 36 between the rails 35 in the same manner as arms 24.

One of the material savings that may be effected by our invention is to make the lens unit preferably out of a single part of a molded acrylic resin. If a more highly corrected objective is required, a number of molded parts may be used as in Fig. 6. However, as parts can be molded very accurately, the usual individual selections for focal lengths for glass lenses is not required, and the manual focusing usual with glass lenses can be avoided. Of course, since it is possible now to mold optical surfaces on glass lenses used for objectives, glass could be used, but since the radially extending arms for engaging the ramps and for turning the lens unit part for focusing are molded as integral parts of the lens, the stronger acrylic resin type of material is to be preferred. The fact that such a part can be accurately molded and assembled to a molded support and a molded adjusting member all designed with their coacting parts accurately to shape and size greatly reduces the cost of such apparatus as no hand fitting and focusing are required.

While we have illustrated a camera as including a focusing device which is a preferred embodiment of our invention, obviously such a focusing device could be used on other photographic instruments such as projectors, enlargers or the like and may take other specific forms. Obviously various arrangements of the focusing device may be suggested to others by this embodiment. We consider as within the ambit of our invention all such forms that come within the appended claims.

We claim:

1. A focusing lens structure for photographic apparatus comprising in combination a supporting plate provided with an aperture extending therethrough and defining an optical axis; a cylindrical surface extending from said support axially of said optical axis and in concentric relation to said aperture; an objective having an arcuate surface integral therewith movably engaging said cylindrical surface for both axial focusing and rotatable movements thereon; a number of like arcuately shaped inclined surfaces fixed to said supporting plate in concentric relation with said cylindrical surface, a similar number of arms integral with and extending radially from said objective and arranged so that a different one of said arms is adapted to engage each of said inclined surfaces and corresponding points thereon at any one time; a focusing member arranged in concentric relation with said cylindrical surface and rotatable relative thereto; a driving connection between said focusing member and said objective whereby rotation of said member causes rotation of said objective and said arms integral therewith while allowing axial focusing movement of said objective for focusing purposes and including axial slots in said member into which the ends of said arms extend; and resilient means between said objective and said focusing member normally urging said arms on the objective into contact with said inclined surfaces.

2. A focusing lens structure according to claim 1 in which said resilient means comprises at least one annular spring member encircling the optic axis and confined between said arms and said focusing member, and means for connecting said spring to said focusing member for rotation therewith.

References Cited in the file of this patent
UNITED STATES PATENTS

| | | |
|---|---|---|
| 1,760,827 | Goldhammer | May 27, 1930 |
| 2,357,326 | Harris | Sept. 5, 1944 |